(12) United States Patent
de Vries

(10) Patent No.: US 8,161,723 B2
(45) Date of Patent: Apr. 24, 2012

(54) CHAIN LINK

(76) Inventor: Oscar de Vries, Den Haag (NL)

( * ) Notice: Subject to any disclaimer, the term of this patent is extended or adjusted under 35 U.S.C. 154(b) by 100 days.

(21) Appl. No.: 12/678,575

(22) PCT Filed: Sep. 2, 2008

(86) PCT No.: PCT/EP2008/061583
§ 371 (c)(1),
(2), (4) Date: Mar. 17, 2010

(87) PCT Pub. No.: WO2009/037107
PCT Pub. Date: Mar. 26, 2009

(65) Prior Publication Data
US 2010/0257835 A1 Oct. 14, 2010

(30) Foreign Application Priority Data
Sep. 19, 2007 (EP) .................... 071167472

(51) Int. Cl.
*F16G 13/12* (2006.01)
*F16G 15/12* (2006.01)
(52) U.S. Cl. ............. 59/78; 59/35.1; 59/84; 59/92
(58) Field of Classification Search ........... 59/35.1, 59/59, 78, 83, 84, 92, 93
See application file for complete search history.

(56) References Cited

U.S. PATENT DOCUMENTS

| | | | | |
|---|---|---|---|---|
| 636,157 | A * | 10/1899 | Maison et al. | 59/26 |
| 686,977 | A * | 11/1901 | Kidd | 59/78 |
| 3,153,898 | A | 10/1964 | Gerhardt | |
| 3,733,811 | A * | 5/1973 | Florjancic | 59/35.1 |
| 3,976,166 | A | 8/1976 | Charpentier | |
| 4,559,890 | A | 12/1985 | Regalbuto et al. | |
| 4,757,681 | A * | 7/1988 | Matsuno et al. | 59/84 |
| 4,779,411 | A * | 10/1988 | Kendall | 59/78 |
| 4,863,418 | A * | 9/1989 | Fillar et al. | 59/59 |
| 4,932,927 | A | 6/1990 | Fillar | |
| 5,956,936 | A | 9/1999 | Ianello et al. | |
| 7,743,597 | B2 * | 6/2010 | Shnayder et al. | 59/93 |

FOREIGN PATENT DOCUMENTS

| | | |
|---|---|---|
| DE | 1 135 721 B1 | 8/1962 |
| DE | 3 514 103 A1 | 10/1986 |
| DE | 10 2005 027 173 A1 | 12/2006 |

(Continued)

OTHER PUBLICATIONS

English Abstract of Japanese Publication No. 09324376.

(Continued)

*Primary Examiner* — David Jones
(74) *Attorney, Agent, or Firm* — Hoffmann & Baron, LLP

(57) ABSTRACT

Chain link comprising two side limbs at both ends joint by curved end portions. The chain Link comprises at least one endless band of fiber material wound along the perimeter of the chain link. The fiber material follows the longitudinal direction of the limbs and the curvature of the end-portions. In a chain made of interlocking chain links of this type, all tensile loads are absorbed by the fiber material, whereas the bearing load due to interlink contact, plus the link shear and bonding stresses near the contact points are absorbed by the end portions.

10 Claims, 5 Drawing Sheets

FOREIGN PATENT DOCUMENTS

| | | |
|---|---|---|
| EP | 0 098 739 A1 | 1/1984 |
| EP | 0 564 954 A1 | 10/1993 |
| EP | 1 736 674 A1 | 12/2006 |
| GB | 830567 | 3/1960 |
| WO | 01/32501 A1 | 5/2001 |

OTHER PUBLICATIONS

Notification of Transmittal of the International Preliminary Report on Patentability for PCT/EP2008/061583.

Written Opinion of the International Searching Authority for PCT/EP20081061583.

* cited by examiner

CHAIN LINK

CROSS-REFERENCE TO RELATED APPLICATIONS

This application is the National Stage of International Application No. PCT/EP2008/061583, filed Sep. 2, 2008, which claims the benefit of European Application No. 07116747.2, filed Sep. 19, 2007, the contents of which is incorporated by reference herein.

FIELD OF THE INVENTION

The invention relates to a chain link and a chain, e.g. long, high strength chains of interlocking chain links for mooring lines and tension legs used to connect, offshore platforms or other buoyant marine constructions to the sea floor or anchor chains for yachts or other ships.

BACKGROUND OF THE INVENTION

Mooring lines and tension legs are generally made from steel link chain cables or polyester ropes having a cross sectional area of up to 750 cm$^2$. In service they carry tensile loads for long periods while submerged in sea water. The weight of steel in sea water is 92 percent of its weight in air. Therefore, due to the weight of the steel chains, the buoyancy of the offshore platforms fixed to the sea floor by such chains must be larger than otherwise required so they can buoy the lines.

Transport and placement of steel mooring chains and tension legs is difficult due to their length and weight. Typically they are transported by ship or rail to a nearby port, and offloaded to very expensive heavy lift crane vessels or special anchor handling vessels for transportation and offshore installation. If their weight and bulk could be reduced substantially and their ability to be lengthened and shortened readily could be improved, then they could be assembled to a predetermined length and more, easily transported, handled, and more rapidly installed with less expensive and more readily available support vessels.

It has been proposed to use ropes of polyethylene fibers, such as the Dyneema® fiber of DSM. The offshore industry is already using polyester ropes for deepwater mooring applications. Such materials are approximately neutrally buoyant in sea water. The tensile strength of such materials is sufficient for long term mooring design. However, ropes have the drawback that they cannot be easily gripped, since their outer covering gets torn off, nor can they be held in place by chain stoppers. Ropes are also sensitive to the abrasive action of mud and sand particles which may penetrate and cause wear between the ropes fibers, thereby weakening of the rope. For these reasons it is often preferred to use metal chain links.

As opposed to fiber ropes, chain links can be held in place by chain stoppers. The chain stoppers can be used to secure the chain at a specific lengthy thereby adjusting the tension and optimizing the related station keeping performance. Typically, a chain stopper has two latches holding the chain in place, bearing upon the shoulders of a single link. A chain is pulled through the chain stopper until the desired position, chain angle and chain tension is obtained. An example of a chain stopper is for instance disclosed in U.S. Pat. No. 7,240,633.

Under axial load, the individual chain links are subjected to all forms of primary stresses, i.e. bearing, bending, shear and tensile stresses. Near the contact points between links, the bearing load due to axial tension is transformed into complex stress patterns that result in the highest stress in the bar at symmetric locations roughly +/−45 degrees on either side of the crown. Otherwise, for a normal steel chain link, much of the steel structure is highly underutilized. This is because the existing manufacturing processes and machinery using forged round bar stock are well embedded into the traditional chain making industry, resulting in very little advancement in the chain geometry or utilization of hybrid solutions. This is particularly the case when a link is held in a chain stopper. Due to cyclic loads, the chains are also susceptible to fatigue failure. In addition, during transport or installation of the chain the individual links may be subjected to high impact loads.

The complicated stress pattern within the individual chain links when the chain is under tensile load hinders a straightforward use of fibers or fiber reinforced material. In fibers, the greatest strength results when the direction of the fibers is in the direction of the load. Unidirectional composite materials have relatively low shear strength parallel to the fiber direction. Link-to-link attachments cause large stresses in the composite matrix in directions having inherently low strength.

U.S. Pat. No. 5,269,129 discloses a chain formed of links made of fiber-reinforced resin composite material. Each link has a terminal loop located at each axial end of a long strap. Loops, located at adjacent ends of successive links, are joined by relatively short connecting links that overlap bushings located within each of the loops. The bushings and connecting links are held in position at each lateral side of the links by pins and washers. A ring surrounds each link where the strap flares to form each terminal loop. The loops may be unitary or spaced laterally to receive within the space a unitary loop of an adjoining link aligned axial Iy with the other loop. A pin located within the loops supports washers at each lateral side of the links to maintain the position of the links and to transfer load between the links. Such chains have the drawback that they have only moderate impact resistance. The links comprise a number of washers, pins and other separate parts resulting in an elaborate to assembling of the chain. Moreover, the strength of the chain is determined by the strength of the pins linking the chain links. The chain links are shaped rather differently from the traditional interlocking toroid steel chain links, so their use requires modification of existing equipment and facilities, such as chain stoppers.

SUMMARY OF THE INVENTION

It is an object of the invention to provide a light-weight link chain which overcomes these problems and combines high impact resistance and high tensile strength with traditional link shape so that existing facilities, in particular chain jacks and chain stoppers, can be used with it.

The object of the invention has been achieved by designing a chain link comprising two side limbs at both ends joined by curved end portions characterized in that the chain link comprises at least one endless band of fiber material wound along the perimeter of the chain link. The fiber material follows the longitudinal direction of the limbs and the curvature of the end-portions. This way, all tensile loads are absorbed by the fiber material, whereas the bearing load due to interlink contact, plus the link shear and bending stresses near the contact points are absorbed by the end portions. The link can be shaped in a similar configuration as traditional oval toroid link shapes, so that existing facilities such as chain stoppers can be used, or may be elongated to ultimately reduce the cost per unit length of the chain. The length to width ratio of the chain links can be made larger, e.g., to utilize fewer end pieces, while using longer limbs, e.g., limbs interconnected with one or more studs to form H-shaped or ladder shaped sections. Ladder shaped sections having multiple studs can be used to control global torsion and/or assembly. The studs can have a small diameter, e.g., a diameter smaller than the diameter of the limbs. Such extended designs can for example be used to replace steel tendons currently used with tension leg platforms.

The endless band of fiber material can be a band of a woven or unidirectional fiber material or combinations thereof, e.g. in different layers. To secure the fiber material and to give it extra strength the fiber material can be embedded in a polymeric matrix, such as an epoxy or polyester matrix. This is especially the case when the fiber material has been wound around the chain link more than once.

A suitable material for the end portions could be steel as used in existing offshore mooring chains, or, alternatively, specialty metals in the areas of high contact loads and stress, combined with other synthetic materials in the non-load bearing structure. Under tensile load, the end-portions form contact points between the various links. In use these contact points are heavily subjected to wear. By making the end portions of steel, the wear resistance of steel and the shear strength is combined with the high tensile strength of the fibers. The center-section can also be made of steel, but since the mechanical tensile stresses are carried by the fiber material, the limbs can be made with a smaller steel cross section or of a light weight material such as aluminum, or a plastic material, such as polyurethane, polyepoxy or polyester.

The end-portions—and optionally also the limbs—can be fitted with a recess along their outline in which the band of reinforcement fiber material is disposed. This way, the fiber material is effectively protected from impact and wear loads, and suffers less from impact fatigue.

In a specific embodiment the end-portions and the limbs can be formed by separate parts. The contact faces between those parts can for example be fitted with a pin and a corresponding pin hole or a similar joint to allow the pieces to interlock.

It is possible to tit the inside contact areas of the end-portions with engineered surfaces, much like the way the human shoulder works. The end-portions would come in two varieties: male and female. The male variety has an extrusion, the female a recess. The male piece is able to rotate and slide in the female recess which reduces the wear normally seen between the contact areas of two chains. This way, the service life of the chain link can be extended.

Optionally, the limbs can be linked by a stud to form an H-shaped center-section. This way, the chain becomes a studlink chain, which is less likely to get tangled than a studless chain, for example when in a chain locker or a bundle.

The fiber material can for example be installed in a predetermined tension, e.g. with a tension designed to most effectively mobilize the available strength of the different load bearing materials considering the geometry, and the different ultimate strength and moduli of elasticity.

Suitable fiber materials are for instance carbon fibers, polyethylene fibers, aramide fibers and glass fibers. Suitable polyethylene fibers are for instance the Dyneema® fibers commercially available from DSM. Suitable aramide fibers are for instance Twaron®, available from Teijin, or Kevlar®, available from DuPont.

In environments that are less extreme than offshore another embodiment of a chain link according to the present invention can be used. With this design, the end portions and limbs are surrounded by a sleeve of the fiber material. The end portions and limbs can for example be formed by a foam core comprising two mirrored shapes both forming half a side of a chain link. This foam can be polyurethane, although any material would be usable. The fibers can be embedded in a polymeric matrix, e.g. an epoxy or polyester matrix. Such a design can for example be attractive for the market of pleasure yachts and the like, where chains are generally subjected to much lower mechanical loads. The chains can be designed to be neutrally buoyant and could be marketed based on a fashionable and trendy outlook.

Such a chain link can be constructed by slipping a fiber sleeve over one of the mirrored shapes, then, the next shape would be placed next to the first one and the fiber would continue to be pulled or rolled from the first mirrored shape over the second mirrored shape. Preferably, the sleeve is somewhat longer than the perimeter of the core, so that the first end of the sleeve is slipped over its other end. This construction allows the chain to be made without any weak spots, since the fiber sleeve covers both the cores and essentially creates a one piece chain. The fiber sleeve can be made out of normal or pre-impregnated carbon fiber. However, pre-impregnated carbon fiber would have the advantage that the sleeve would not have to be treated with epoxies during application, thereby simplifying the construction process.

The chain links as described can form a chain by having the curved end portion of a chain link grip around a curved end portion of an adjacent chain link. These chains are particularly useful for anchoring a floating structure, such as a ship or an offshore platform, wherein at least the chain is used to link the floating structure, e.g., to a seabed.

The chain can for example be assembled by assembling a first chain link having a recess along its outer fiber, wherein subsequently a band of fiber material is wound around the chain link within its recess, then a second link is assembled having one curved end portion gripping around a curved portion of the first link, then the second link is rotated while a fiber supply winds a fiber material around the chain link, then these steps are repeated assembling further interlocking chain links until a chain of a desired length is obtained.

BRIEF DESCRIPTION OF THE DRAWINGS

The invention will now be described in more detail, by way of example only, with reference to the accompanying drawing, wherein.

DETAILED DESCRIPTION OF THE PREFERRED EMBODIMENTS

Figure 1:
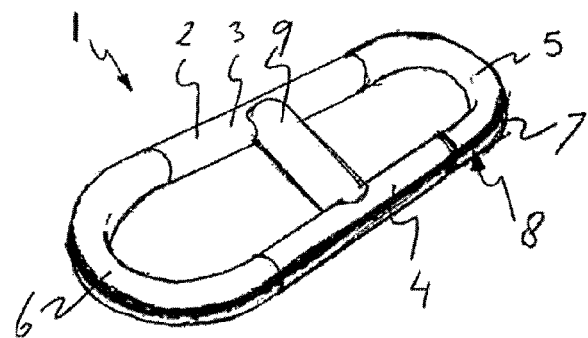
FIG. 1 shows in perspective view of a first embodiment, of a cable link according to the present invention.

FIG. 1 shows a stud link 1 comprising a body 2 of two side limbs 3, 4 of a light weigh plastic material, such as polyurethane. At both ends the side limbs 3, 4 are mutually joined by curved steel end portions 5, 6. The end portions 5, 6 have the shape of a circular segment, the first end portion 5 being of a smaller curvature radius than the other end portion 6. The body 2 spans a band 7 of pre-tensioned unidirectional reinforcement fiber material, such as carbon fibers wound along the outer perimeter of the body 2. The end portions 5, 6 and the side limbs 3, 4 comprise a recess 8 extending along the outer perimeter of the body 2 to receive the band of reinforcement fiber material. A crossbar or stud 9 spaces the two limbs 3, 4. The crossbar 9 and the limbs 3, 4 are made of one single piece of a light weight plastic material, such as polyurethane foam. The end portions are made of steel.

Figure 2A:
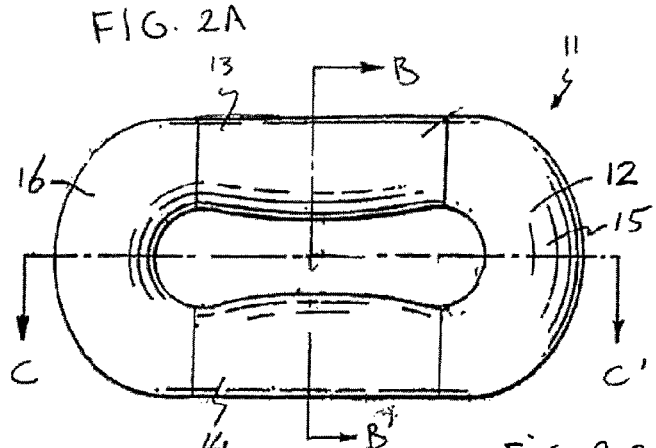
FIG. 2A shows a plan view of a second embodiment of a cable link according to the present invention.

FIG. 2A shows a chain link 11 without a stud. The link 11 comprises a body 12 with side limbs 13, 14 and end portions 15, 16. In this particular embodiment the end portions are of equal size. The link 11 is shown in cross section along line B-B' in FIG. 2B. In FIG. 2C, the link 11 is shown in cross section along line C-C'. An endless band 17 of fiber material is sunk in an endless recess 18 extending along the outer perimeter of the body 12. The limbs 13, 14 and the end portions 15, 16 are all provided with a recess. When assembled, these recesses are in line to form the endless recess 18.

Figures 3A, 3B:
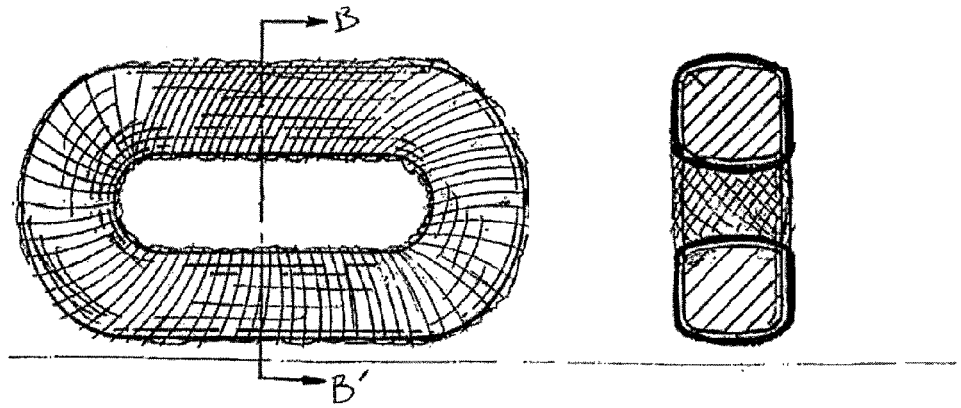
FIG. 3A shows a plan view of a third embodiment of a cable link according to the present invention.
FIG. 3B shows a cross section along line B-B' in FIG. 3A.
Figure 3C:
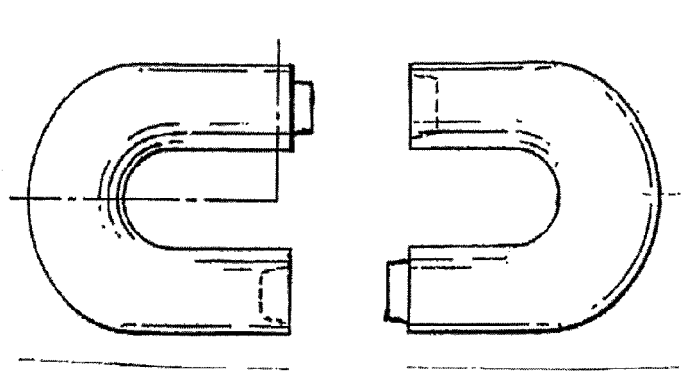
FIG. 3C shows the body of the cable link according to FIG. 3A.

FIG. 3A shows in plan view a third embodiment of a cable link according to the invention. Cable link 21 comprises a body 22 (see FIG. 3B) surrounded by a sleeve 27 of a fiber material embedded in a matrix of a cured polymeric resin, such as an epoxy resin. The sleeve 21 has its outer ends joined to each other to form a closed loop. The cable link has two straight sides 23, 24, and two circularly curved end portions 25, 26. As shown in FIG. 3C, the body 22 is made of two C-shaped sections 28, 29, each forming a curved end portion 25, 26 at both ends extended with a half section of the straight edges 23, 24. Both C-shaped sections 28, 29 have one free end provided with a projection 30 and another free end provided with a correspondingly shaped recess 31. The sections 28, 29 are glued together to form the body 22. The body 22 is made of a single piece of a light weight plastic material, such as foamed polyurethane.

Figure 4A:
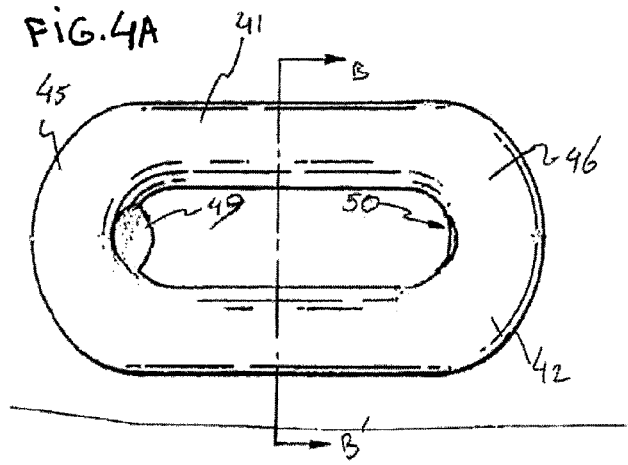
FIG. 4A shows a plan view of a third embodiment of a cable link according to the present invention.
Figure 4B:
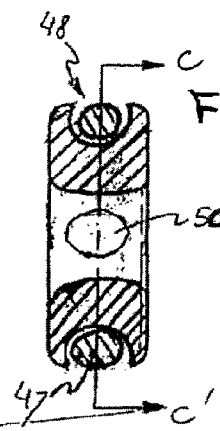
FIG. 4B shows a cross section over line B-B' in FIG. 4A.
Figure 4C:
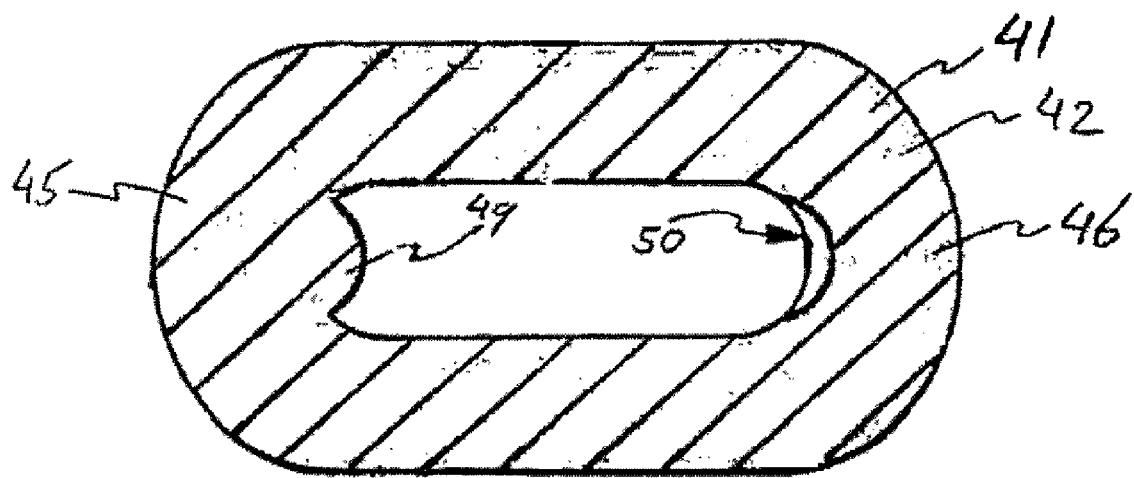
FIG. 4C shows a longitudinal cross section over line C-C' in FIG. 4B.

FIG. 4A shows a further possible main link 41 according to the invention, shown in FIG. 4B m cross section along line B-B'. FIG. 4C shows the same chain link in longitudinal cress section along line C-C' in FIG. 4B. As in the embodiment of FIG. 2A, a pre-tensioned fiber band 47 is sunk in a recess 48 extending over the outer perimeter of the body 42. In this embodiment, one of the end portions 45 is provided with a bulge 49 on the inner perimeter of its curvature. The other end portion 46 is provided with a corresponding socket 50. In an assembled chain, the bulge 49 of each cable link 41 is shaped to cooperate with the socket 50 of an adjacent cable link 41 to form a ball joint or articulation.

Figure 5:
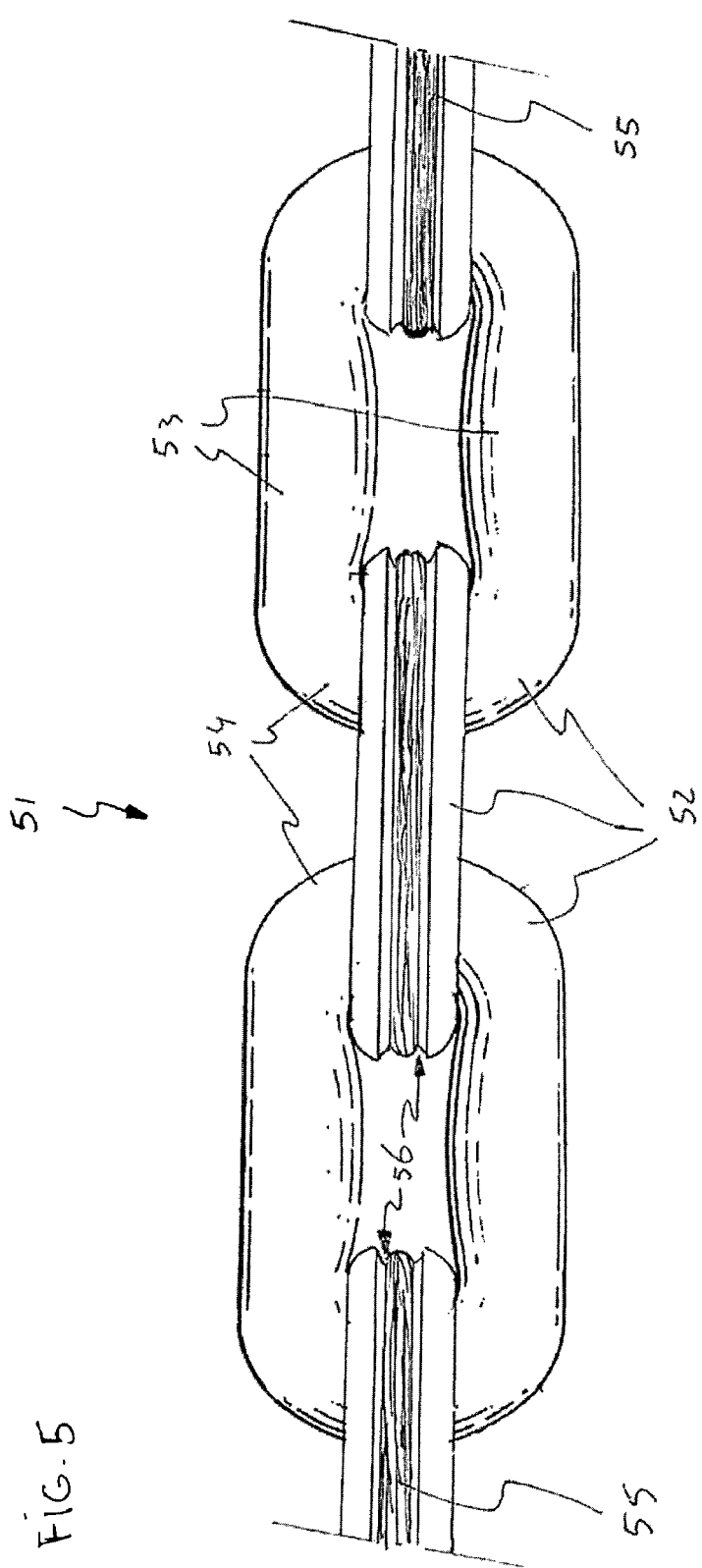
FIG. 5 shows a chain according to the present invention.

FIG. 5 shows a chain 51 made of interlocking oval toroid chain links 52. Each chain link 52 comprises two side limbs 53 at both ends joint by curved end portions 54. The curved end portion 54 of a chain link 52 grip around a curved end portion 54 of an adjacent chain link 52. Each one of the chain links 52 is provided with an endless band 55 of fiber material wound along the perimeter of the chain link 52. The endless bands 55 lay sunk within a recess 56 extending along the perimeter of the chain link 52. The curvature of the curved end portions of the toroid links 52 have an inner diameter corresponding to the diameter of the side limbs 53. Accordingly, the distance between the side limbs 53 corresponds to the diameter of the side limbs 53. As a result, a chain link 52 can only slide in one direction relative to an interlocking adjacent link 52, and the contact surface between two interlocking links 52 is maximized. Optionally, the side limbs 53 can bulge inwards, so that the movement of a link 52 relative to an interlocking adjacent link 52 is restricted to two degrees of freedom of rotational movement and the links 52 can only hinge in two directions relative to the respective adjacent link.

Figure 2B:
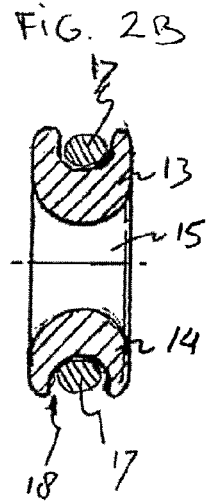
FIG. 2B shows a cross section along the line B-B' in FIG. 2A.
Figure 2C:
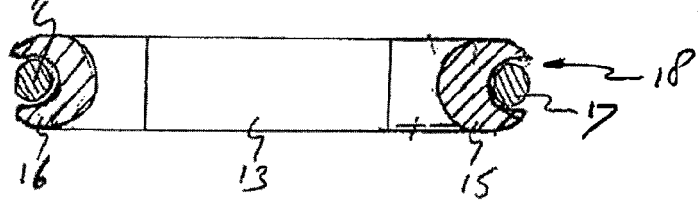
FIG. 2C shows a cross section along the line C-C' in FIG. 2A.

The chain links 52 in FIG. 5 are of the type as shown in FIG. 2A-2C, but they can also be of the type shown in FIG. 1, FIGS. 3A-3C or FIGS. 4A-AC or any other suitable type of chain link according to the present invention.

Figure 6:
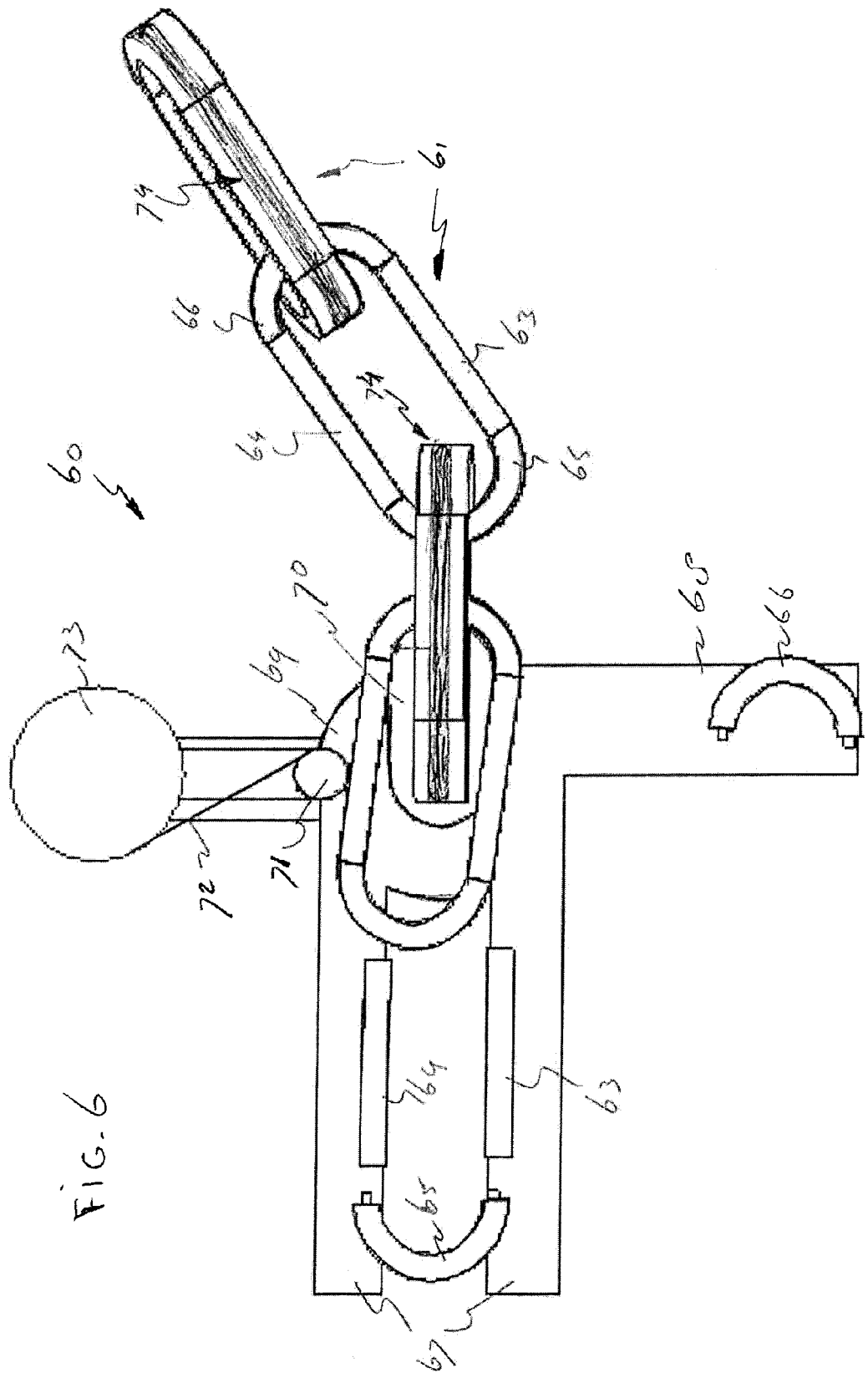
FIG. 6: shows a device for assembling a chain according to the present invention.

FIG. 6 shows schematically a plan view of a device 60 for assembling a chain according to the present invention. The chain is made of oval toroid chain links 61 comprising two side limbs 63, 64 linked at both sides by C-shaped curved end portions 65, 66. The device 60 comprises two parallel supply lines 67 for the simultaneous supply of two side limbs 63, 64 and a curved end portion 65. A third supply line 68 extends in a direction perpendicular to the other two and serves to supply further curved end portions 66. The three supply lines 67, 68 come together at a platform 69 with a U-shaped opening 70, where an assembled chain link 61 is positioned in a vertical position, with its side limbs 63, 64 extending horizontally. The supply lines 67 transport the side limbs 63, 64 until they lay at opposite sides of the vertical chain link in the U-shaped opening 70. A curved end portion 65 follows the side limbs 63, 64 to be attached to these at one end, while the third supply line 68 supplies the other curved end portion 66 which passes the open inner area of the vertical chain link 61 in the U-shaped opening 70 and is then linked to the outer ends of the present side limbs 53, 63, thus forming a new chain link 61 interlocking the vertical chain link in the U-shaped opening 70. The assembled chain link 61 on the platform 69 is then rotated while a spinner 71 spins a fiber material 72 from a roll 73 of fiber material around the chain link 61. The fiber material is received in a recess 74 extending along the outer fiber of the chain link 61. After winding the fiber material, the chain is moved further over a distance corresponding to the length of a single chain link 61, and the newly assembled chain link 61 on the platform 59 is turned to a vertical position, taking the place of the chain link positioned in the U-shaped opening 70 and the stops described above are repeated until a chain of a desired length is obtained.

The invention claimed is:

1. A chain comprising at least two interlocking chain links, wherein each chain link comprises at least two side limbs, each of them having two ends, said side limbs at said ends being joined by curved end portions, and one endless band of reinforcement fiber material wound along the outer perimeter of each chain link, wherein a curved end portion of one chain link grips around a curved end portion of the interlocking other chain link, wherein the curved end portion of the one link is provided with a bulge cooperating with a corresponding socket in the interlocking other link, said bulge being located on an inside contact area of the end portion of the one link and said socket being located on an inside contact area of the end portion of the interlocking other link.

2. The chain according to claim 1, wherein at least the end portions of the at least two interlocking chain links are made of steel.

3. The chain according to claim 1, wherein at least the end portions of the at least two interlocking chain links comprise a recess along their outer perimeter to receive and protect the band of reinforcement fiber material.

4. The chain according to claim 1, wherein the side limbs of the at least two interlocking chain links are made of a plastic material.

5. The chain according to claim 1, wherein the fiber material is pre-tensioned.

6. The chain according to claim 1, wherein the fiber material is selected from the group of carbon fibers, polyethylene fibers, aramide fibers and glass fibers.

7. The chain according to claim 1, wherein the at least two interlocking chain links are stud links comprising a crossbar between the two limbs.

8. The chain according to claim 1, wherein the band of fiber material forms a sleeve surrounding the limbs and end portions of the at least two interlocking chain links.

9. The chain according to claim 8, wherein both the end portions and side limbs are made of a plastic material.

10. A method for manufacturing a chain according to claim 1, wherein a first chain link is assembled having a recess along its outer perimeter, then a fiber material is wound around the chain link within its recess, then a second link is assembled having one curved end portion gripping around a curved end portion of the first link, then the second link is rotated while a fiber supply winds a fiber material around the chain link, then these steps are repeated assembling further interlocking chain links until a chain of a desired length is obtained.

* * * * *